(12) United States Patent
Akiyama et al.

(10) Patent No.: US 6,343,058 B1
(45) Date of Patent: Jan. 29, 2002

(54) OPTICAL PICKUP DEVICE APPLICABLE TO TWO KINDS OF RECORDING MEDIA WITH MINIMIZED DETERIORATION OF A BEAM SPOT

(75) Inventors: Hiroshi Akiyama; Yoshitaka Takahashi, both of Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 09/182,662

(22) Filed: Oct. 30, 1998

(30) Foreign Application Priority Data

Oct. 30, 1997 (JP) ............................................... 9-298425
Nov. 28, 1997 (JP) ............................................... 9-327819

(51) Int. Cl.$^7$ ............................................... G11B 7/00
(52) U.S. Cl. ..................................... 369/112.1; 369/94
(58) Field of Search .............................. 369/103, 110, 369/109, 112, 44.23, 44.24, 94

(56) References Cited

U.S. PATENT DOCUMENTS

| | | | | |
|---|---|---|---|---|
| 5,696,749 A | * | 12/1997 | Brazas et al. | 369/109 |
| 5,696,750 A | * | 12/1997 | Katayama et al. | 369/109 |
| 5,912,868 A | * | 6/1999 | Hayashi et al. | 369/94 |
| 6,081,498 A | * | 6/2000 | Yoo et al. | 369/112 |

FOREIGN PATENT DOCUMENTS

| | | |
|---|---|---|
| JP | 6-259804 | of 1994 |
| JP | 8-55363 | of 1996 |

OTHER PUBLICATIONS

O plus E, Mar. 1991, pp. 86–90.
"A High Density Dual Grating for Magneto–Optical Disk Head", H. Maeda, et al., Optics, vol. 20, No. 8, Mar. 1991, pp. 500–505.

"Twin Lens Type DVD Optical Pickup", Optical Technology Contact, vol. 33, No. 11, 1995, pp. 619–624.

"Deflection Hologram Optical Element and Application to a Magneto–Optical disc head", R. Katayama, Optronics, 1996, No. 8, pp. 112–116.

* cited by examiner

Primary Examiner—Nabil Hindi
(74) Attorney, Agent, or Firm—Dickstein Shapiro Morin & Oshinsky LLP (57) ABSTRACT

An optical pickup device shares an objective lens for two different light sources so as to handle two kinds of optical recording media, that is, a first optical recording medium and a second optical recording medium, the second optical recording medium having a thickness larger than a thickness of the first optical recording medium. A first light source emits a first beam having a first wavelength. A second light source emits a second beam having a second wavelength. An objective lens converges the first beam and projects the converged first beam onto the first optical recording medium. The objective lens also converges the second beam and projects the converged second beam onto the second optical recording medium. A second coupling lens changes the second beam to a beam which matches the objective lens. The second coupling lens alone has a wavefront aberration substantially proportional to a field angle thereof so that the second beam after passing through the second coupling lens has a wavefront different from a wavefront of the first beam.

10 Claims, 7 Drawing Sheets

OPTICAL PICKUP DEVICE APPLICABLE TO TWO KINDS OF RECORDING MEDIA WITH MINIMIZED DETERIORATION OF A BEAM SPOT

BACKGROUND OF THE INVENTION

1. Field of the Invention

The present invention generally relates to an optical pickup device and, more particularly, to an optical pickup device adapted to handle two kinds of optical information recording media.

2. Description of the Related Art

Conventionally, a compact disc (hereinafter, referred to as CD-R) is known as an optical information recording medium. A digital videodisc (hereinafter referred to as DVD) having a higher recording density has been put into practice. The DVD has a thickness different from the thickness of the CD-R. Additionally, a frequency of a beam used for the DVD is different from that of the CD-R. Thus, a conventional optical pickup device for the CD-R cannot be used for recording information on or reproducing information from the DVD. Similarly, an optical pickup device designed for the DVD cannot be used for recording information on or reproducing information from the CD-R.

In order to enable an optical disc apparatus to record information on or reproduce information from both the CD-R and the DVD, both the optical pickup device for the CD-R and the optical pickup device for the DVD may be provided in the optical disc apparatus so that one of the optical pickup devices is selectively used in response to a disc to be used. However, this method increases size and cost of the optical disc apparatus since two separate optical pickup devices must be provided in the optical disc apparatus.

From this point of view, an attempt was made to share a part of an optical system of each of the optical pickup devices by providing two light sources emitting light beams having different wavelengths. In this case, if an objective lens is shared by the two optical pickup devices, the following problem may occur. That is, if an objective lens, which is designed to provide a desired performance for the DVD, is used for the CD-R, a wavefront aberration is deteriorated due to a difference between wavelength or thickness when the objective lens is used for the CD-R. The deterioration of the wavefront surface may cause side lobes in a beam spot, which results in a decrease in a peak strength and expansion of a spot diameter. Accordingly, an operation on the CD-R cannot be performed in a good condition.

In order to solve the above-mentioned problem, in Japanese Laid-Open Patent Application No.8-55363, a method is suggested for changing an object distance in response to a selected optical information recording medium, the object distance being related to a beam incident on an objective lens from a light source. That is, a parallel beam is incident on the objective lens from the light source when information is recorded on the DVD. On the other hand, a divergent beam is incident on the objective lens when the CD-R is selected. In such a method, an appropriate beam spot can be formed on a recording surface of an optical recording medium irrespective of a thickness of the optical recording medium.

However, the above-mentioned patent document does not refer to a specific structure of a condenser lens that changes a light beam to a parallel beam or a divergent beam. Additionally, there is no consideration as to the deterioration of a beam spot associated with an offset generated in an optical axis of an objective lens.

It is a very important issue for an optical pickup device to obtain a high optical efficiency when the optical pickup is used for the DVD or the CD-R. Additionally, it is a very important issue to control the deterioration of a beam spot associated with an offset of an optical axis of an objective lens within an allowable range.

BACKGROUND OF THE INVENTION

It is a general object of the present invention to provide an improved and useful optical pickup device in which the above-mentioned problems are eliminated.

A more specific object of the present invention is to provide an optical pickup apparatus which shares an objective lens for two different light sources so as to handle two kinds of optical information recording media and which has a high optical efficiency and decreases deterioration in a beam spot caused by an offset of an optical axis of an objective lens.

In order to achieve the above-mentioned objects, there is provided according to one aspect of the present invention an optical pickup device applicable to both a first optical recording medium and a second optical recording medium, the second optical recording medium having a thickness larger than a thickness of the first optical recording medium, the optical pickup device comprising:

a first light source used for the first optical recording medium, the first light source emitting a first beam having a first wavelength;

a second light source used for the second optical recording medium, the second light source emitting a second beam having a second wavelength;

an objective lens converging the first beam and projecting the converged first beam onto the first optical recording medium, the objective lens also converging the second beam and projecting the converged second beam onto the second optical recording medium,     an optical path guiding unit guiding the first beam and the second beam to the same optical path directed to the objective lens;

a signal extracting unit for extracting signals from the first and second beams reflected by a selected one of the first optical recording medium and the second optical recording medium; and     a second coupling lens coupling the second beam emitted from the second light source, the second coupling lens alone having a wavefront aberration substantially proportional to a field angle thereof so that the second beam after passing through the second coupling lens has a wavefront different from a wavefront of the first beam.

In the above-mentioned invention, the first beam emitted by the first light source toward the objective lens can be either a parallel beam or a convergent beam. Since the objective lens is designed to match the first optical recording medium having a smaller thickness, the objective lens can focus the first beam onto the first optical recording medium with an appropriate beam spot. On the other hand, the second beam is changed by the second coupling lens so that the second beam has a wavefront different from a wavefront of the first beam. That is, for example, if the first beam is incident on the objective lens as a parallel beam, the second beam is incident on the objective lens as a divergent beam. If the first beam is incident on the objective lens as a divergent beam, the second beam is incident on the objective lens as a divergent beam having a stronger divergence.

Thus, according to the above-mentioned invention, an appropriate beam spot can be formed on both the first optical recording medium having a smaller thickness and the second optical recording medium having a larger thickness, by changing the second beam to a beam which can be appropriately focused on the second recording medium by a combination of the second coupling lens and the objective lens.

In the optical pickup device according to the present invention, the objective lens may have a performance optimum for at least one of a recording operation, a reproducing operation and an erasing operation performed on the first optical recording medium.

Accordingly, a recording operation, a reproducing operation, or an erasing operation can be appropriately performed with respect to both the first optical recording medium having a smaller thickness and the second optical recording medium having a larger thickness.

In one embodiment of the present invention, the second coupling lens may provide a predetermined divergence to the second beam. Additionally, the optical pickup device according to the present invention may further comprise a first coupling lens changing the first beam into a parallel beam.

The second coupling lens may be a single lens, and one of opposite surfaces of the second coupling lens may be an aspherical surface and the other may be one of a spherical surface and a flat surface. According to this structure, the second coupling lens can be easily fabricated since one side of the second coupling lens is a flat surface or a spherical surface. Especially if one side of the second coupling lens is a flat surface, there is no need to consider an eccentricity between opposite sides of the second coupling lens. Thus, the design of the second coupling lens is easy.

Alternatively, the second coupling lens may include two single lenses coupled to each other, each of opposite surfaces of the second coupling lens may be an aspherical surface, and a coupling surface between the opposite surfaces of the second coupling lens may also be an aspherical surface. According to this structure of the second coupling lens, an amount of a wavefront aberration is easily controlled, which results in an easy design of the second coupling lens.

Additionally, in the optical pickup device according to the present invention, the second coupling lens may be a single lens having opposite surfaces of which one is a flat surface and the other is an aspherical surface; and the second coupling lens may be designed to provide an optimum performance to a divergent beam having an object distance which satisfies a relationship $lc=\alpha \cdot fc$, where lc is a designed object distance, fc is a focal length and $\alpha$ is a constant.

According to this invention, when the second coupling lens is designed in the same manner as a normal lens without using a special evaluation function, an object distance which is one of the design conditions can be easily estimated and an easy design of the second coupling lens can be achieved.

Additionally, the optical pickup device according to the present invention may further comprise:

a first returning beam receiving unit receiving a first returning beam reflected by the first optical recording medium and returning toward the first light source;

a first optical path separating unit separating an optical path of the first returning beam from an optical path of the first beam emitted by the first light source;

a second returning beam receiving unit receiving a second returning beam reflected by the second optical recording medium and returning toward the second light source; and a second optical path separating unit separating an optical path of the second returning beam from an optical path of the second beam emitted by the second light source, wherein the first light source, the first returning beam receiving unit and the first optical path separating unit together are integrated as a first light source/light receiving unit, and the second light source, the second returning beam receiving unit and the second optical path separating unit together are integrated as a second light source/light receiving unit.

In one embodiment, the first optical path separating unit may utilize a state of polarization of the first beam so as to separate the optical path, and the second optical path separating unit may utilize a state of polarization of the second beam so as to separate the optical path.

Additionally, the first optical recording medium may have a base plate having a thickness of 0.6 mm and the second optical recording medium may have a base plate having a thickness of 1.2 mm, and a magnification of an optical system comprising the second coupling lens and the objective lens may be more than 0.2.

Additionally, there is provided according to another aspect of the present invention an optical pickup device applicable to both a first optical recording medium and a second optical recording medium, the second optical recording medium having a thickness larger than a thickness of the first optical recording medium, the optical pickup device comprising:

a first light source used for the first optical recording medium, the first light source emitting a first beam having a first wavelength;

a second light source used for the second optical recording medium, the second light source emitting a second beam having a second wavelength;

an objective lens converging the first beam and projecting the converged first beam onto the first optical recording medium, the objective lens also converging the second beam and projecting the converged second beam onto the second optical recording medium, an optical path guiding unit guiding the first beam and the second beam to the same optical path directed to the objective lens;

a signal extracting unit for extracting signals from the first and second beams reflected by a selected one of the first optical recording medium and the second optical recording medium;

a first aperture limiting member limiting the first beam entering the objective lens; and a second aperture limiting member limiting the second beam entering the objective lens, wherein one of the first and second aperture limiting members includes a wavelength selective filter having a wavelength selectivity for transmitting one of the first and second beams and reflecting the other of the first and second beams so as to limit an opening area thereof.

Accordingly, a diameter of each of the first beam and the second beam can be changed by the first and second aperture limiting members so that the first beam has a diameter appropriate for forming a good beam spot on the first optical recording medium and the second beam has a diameter by which side lobes are not generated in a beam spot. Thus, the optical pickup device according to this invention can appropriately perform a recording operation, a reproducing operation or an erasing operation with respect to both the first optical recording medium and the second optical recording medium.

In one embodiment of the present invention, the wavelength selective filter may be formed on a transparent flat plate on a side of the first and second light sources. Additionally, the wavelength selective filter may be formed on a transparent flat plate slanting with respect to an optical axis of a beam incident on the transparent flat plate.

In the optical pickup device according to the present invention, an aperture formed by the wavelength selective filter may be an oval, and the transparent flat plate may be slanted in a direction of a major axis of the oval with respect to a plane perpendicular to the optical axis of the beam incident on the transparent flat plate, a slanting angle of the transparent flat plate being set so that a projection of the aperture of the wavelength selective filter on a plane perpendicular to the optical axis of the beam becomes substantially a circle.

Additionally, in the optical pickup device according to the present invention, the objective lens may be designed to provided a performance optimum to the first optical recording medium; and the wavelength selective filter may be included in the second aperture limiting member so as to transmit the first beam and reflect the second beam.

The optical pickup device according to the above-mentioned invention may further comprise:

a first coupling lens changing the first beam into a parallel beam; and a second coupling lens changing the second beam into a divergent beam.

Additionally, the optical pickup device according to the present invention may further comprise:

a first returning beam receiving unit receiving a first returning beam reflected by the first optical recording medium and returning toward the first light source;

a first optical path separating unit separating an optical path of the first returning beam from an optical path of the first beam emitted by the first light source;

a second returning beam receiving unit receiving a second returning beam reflected by the second optical recording medium and returning toward the second light source; and a second optical path separating unit separating an optical path of the second returning beam from an optical path of the second beam emitted by the second light source, wherein the first light source, the first returning beam receiving unit and the first optical path separating unit together are integrated as a first light source/light receiving unit, and the second light source, the second returning beam receiving unit and the second optical path separating unit together are integrated as a second light source/light receiving unit.

Further, in the optical pickup device according to the present invention, the optical path guiding unit may include a prism which transmits the first beam and reflects the second beam.

In one embodiment according to the present invention, the first optical recording medium may be a disc having a thickness of 0.6 mm;

the second optical recording medium may be a disc having a thickness of 1.2 mm;

the first wavelength may be 650 nm and the second wavelength may be 780 nm; and a numerical aperture of the first aperture limiting member may be 0.6 and a numerical aperture of the second aperture limiting member may be 0.5.

Other objects, features and advantages of the present invention will become more apparent from the following detailed description when read in conjunction with the accompanying drawings.

DETAILED DESCRIPTION OF THE PREFERRED EMBODIMENTS

Figure 1:
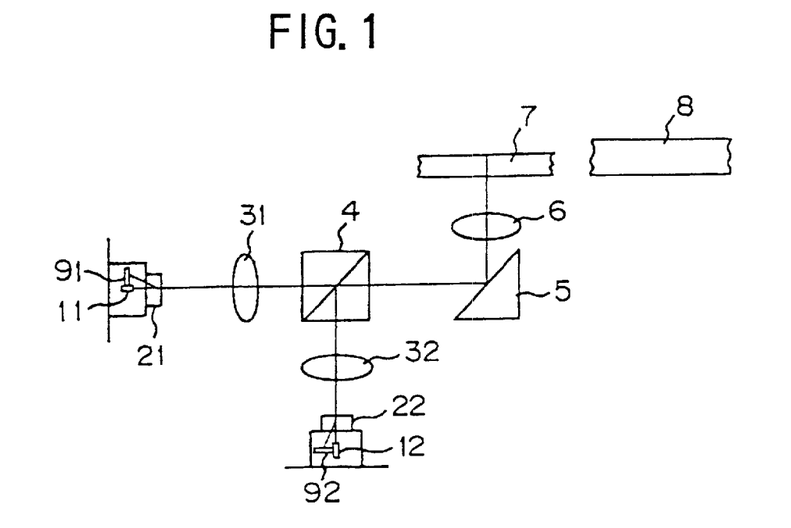
FIG. 1 is an illustration of an optical system of an optical pickup device according to a first embodiment of the present invention.

A description will now be given of a first embodiment of the present invention. FIG. 1 is an illustration of an optical system of an optical pickup device according to the first embodiment of the present invention.

In FIG. 1, an optical recording medium having a smaller thickness is indicated by a reference numeral 7, and an optical recording medium having a larger thickness is indicated by a reference numeral 8. In this embodiment, the optical recording medium 7 having a smaller thickness is a DVD having a thickness of 0.6 mm, and the optical recording medium 8 having a larger thickness is a CD-R having a thickness of 1.2 mm.

A first light source 11 is a semiconductor laser chip for emitting a laser beam having a wavelength of 670 nm. A second light source 12 is a semiconductor laser chip for emitting a laser beam having a wavelength of 785 nm. A first optical path separating unit 21 is provided near the semiconductor laser chip 11, and a second optical path separating unit 22 is provided near the second light source 12.

The laser beam emitted by the first light source 11 passes through the first optical separating unit 21 and enters a beam splitter 4 via a coupling lens 31 for the first light source 11. On the other hand, the laser beam emitted by the second light source 12 passes through the second optical separating unit 22 and enters the beam splitter 4 via a coupling lens 32 for the second light source 12. The laser beam exiting the beam splitter 4 enters an objective lens 6 via a deflection prism 5. The laser beam is focused on the optical recording medium 7 or 8 by the objective lens 6. A first beam-receiving unit 91 is provided near the first light source 11, and a second beam-receiving unit 92 is provided near the second light source 12.

It should be noted that the first light source 11, the first optical path separating unit 21 and the first beam-receiving unit 91 are integrated as a first light source/beam receiving unit 41. Similarly, the second light source 12, the second optical path separating unit 22 and the second beam-receiving unit 92 are integrated as a second light source/beam receiving unit 42.

Figures 2, 4:
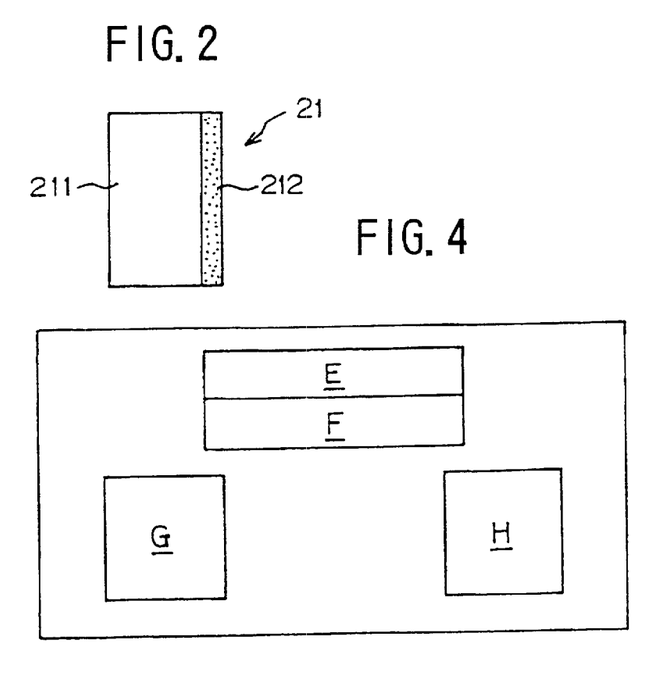
FIG. 2 is an illustration for explaining a first optical path separating unit shown in FIG. 1.
FIG. 4 is an illustration of a beam receiving unit shown in FIG. 1.

FIG. 2 illustrates the first optical path separating unit 21. The first optical path separating unit 21 comprises a polarization hologram 211 and a ¼-wavelength plate (hereinafter, referred to as λ/4 plate) 212.

The polarization hologram 211 includes a hologram having a grating structure so that a component of the beam parallel to the grating is subjected to a hologram effect and a component of the beam perpendicular to the grating is transmitted. As for the polarization hologram 211, one made of LiNbO3 disclosed in "OplusE, March 1991, from page 86" or a dual grating having a narrow pitch and deep grooves disclosed in "Optics, vol. 20, no. 8, August 1991, from page 500" may be used.

The λ/4 plate 212 converts the beam, which is emitted from the first light source and has the wavelength of 650 nm, into a circularly polarized light.

It should be noted that the second optical path separating unit 22 has the same structure as the first optical path separating unit 21.

As shown in FIG. 1, when the optical recording medium 7 having a smaller thickness is set in the apparatus, the first light source 11 is used.

A direction of the grating of the polarization hologram 211 included in the first optical path separating unit 21 is determined so that the laser beam emitted from the first light source 11 is transmitted therethrough. The laser beam transmitted through the polarization hologram 211 is coupled to an optical system by the coupling lens 31 for the first light source 11. In the present embodiment, a coupling effect of the coupling lens 31 is a collimate effect which changes the laser beam emitted from the first light source 11 to a substantially parallel beam. The coupled laser beam transmits through the beam splitter 4, and enters the objective lens 6 after being deflected by the deflection prism 5. The laser beam is projected onto the optical recording medium 7 having a smaller thickness so that the laser beam transmits through a base plate having a thickness of 0.6 mm and is focused on a recording surface so as to form a beam spot on the recording surface.

The laser beam projected onto the optical recording medium 7 is reflected by the recording surface, and returns toward the objective lens 6. The reflected laser beam may be referred to as a returning beam. The returning beam returns to the coupling lens 31 by being deflected by the deflection prism 5 and being transmitted through the beam splitter 4. The returning beam is condensed by the coupling lens 31, and enters the first optical path separating unit 21. The returning beam then passes through the λ/4 plate 212 and is changed to a linear polarization light having a polarization surface 90 degrees different from that of the laser beam emitted from the first light source 11 toward the coupling lens 31. Accordingly the returning beam is subjected to a holographic action (diffraction) of the polarization hologram 211.

Figure 3:
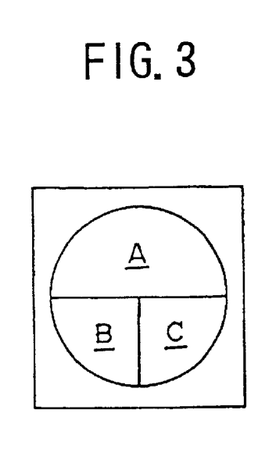
FIG. 3 is an illustration of holograms formed in a polarization hologram shown in FIG. 2.

Three kinds of holograms, holograms A, B, and C, shown in FIG. 3 are formed in the deflection hologram 211. The returning beam incident on the holograms A, B and C is deflected in different directions and an optical path of the return path is separated from the optical path of the laser beam toward the first optical path separating unit 21.

In the first beam-receiving unit 91, light receiving areas E, F, G and H are formed as shown in FIG. 4. A part of the returning beam incident on the hologram A of the polarization hologram 212 is deflected and is focused on a boundary between the light receiving areas E and F so that a focus error signal (corresponding to a difference (e–f) of outputs e and f of the respective light receiving areas E and F) is generated by a knife-edge method by using a boundary between the hologram A and each of the holograms B and C as a knife-edge. The returning beam incident on the holograms B and C is focused on the light receiving areas G and H, respectively. A difference (g–h) between outputs g and h corresponding to the respective light receiving areas G and H is rendered to be a tracking error signal according to a push-pull method. Additionally, as a reproducing signal for reproducing information recorded on the recording surface, a signal (e+f+g+h) or a part of the signal (e+f+g+h) can be used.

In FIG. 1, when the optical recording medium 8 having a larger thickness is used instead of the recording medium 7 having a smaller thickness, the second light source is used.

Similar to the first optical path separating unit 21, the second optical path separating unit 22 comprises a polarization hologram and a λ/4 plate. A direction of a grating of the polarization hologram included in the second optical path separating unit 22 is determined so that the laser beam emitted from the second light source 12 is transmitted therethrough. The laser beam transmitted through the polarization hologram is changed to a circularly polarized light by the λ/4 plate, and enters the second coupling lens 32 for the second light source. The laser beam is then changed to beam having a desired divergence by decreasing the divergence of the laser beam emitted from the second light source. The beam having the desired divergence is reflected by the beam splitter 4 and enters the objective lens 6 via the deflection prism 5. The beam entering the objective lens is projected onto the optical recording medium 8 having a larger thickness so that the laser beam transmits through a base plate having a thickness of 1.2 mm and is focused on a recording surface so as to form a beam spot on the recording surface.

The laser beam projected onto the optical recording medium 8 is reflected by the recording surface, and returns toward the objective lens 6. The reflected laser beam may be referred to as a returning beam. The returning beam returns to the coupling lens 32 by being deflected by the deflection prism 5 and being reflected by the beam splitter 4. The returning beam is converged by the coupling lens 32, and enters the second optical path separating unit 22. The returning beam then passes through the λ/4 plate and is changed to a linear polarization light having a polarization surface 90 degrees different from that of the laser beam emitted from the second light source 12 toward the coupling lens 32. Accordingly the returning beam is subjected to a holographic action (diffraction) of the polarization hologram in the second optical path separating unit 22.

The polarization hologram of the second optical path separating unit 22 has the same construction as the above-mentioned polarization hologram 211. Accordingly, a focus error signal, a tracking error signal and a reproducing signal, if necessary, are obtained according to an output of the second light receiving unit 92 having the same structure as the first light receiving unit 91.

It should be noted that the beam splitter 4 may be one using an ordinary semitransparent mirror as a separating film. However, such a beam splitter having a semitransparent mirror can use only half of the laser beam emitted from the light source 11 or 12 for a writing operation. Accordingly, an intensity of the returning beam is decreased to a quarter of the intensity of the original laser beam emitted by the light source 11 or 12, and, thereby, an optical efficiency is low.

In order to solve the above-mentioned problem, the beam splitter 4 may transmit substantially 100 percent of the laser beam from the first light source 11, and reflect substantially 100 percent of the laser beam from the second light source. This can be achieved since the wavelength of the laser beam emitted by the first light source 11 is different from the wavelength of the laser beam emitted by the second light source 12. Specifically, a dichroic filter can be used as a separating film, the dichroic filter having an optical characteristic to transmit 100 percent of a light having a wavelength of 650 nm and reflect 100 percent of a light having a wavelength of 785 nm. According to usage of such a dichroic filter, an optical loss caused by the beam splitter 4 can be substantially decreased to zero.

The objective lens 6 is designed to match the laser beam emitted by the first light source 11. The coupling lens is designed to form an appropriate beam spot on the recording medium 7 having a smaller thickness in cooperation with the objective lens 6.

On the other hand, the coupling lens 32 for the second light source 12 has the function to change the laser beam emitted from the second light source 12 to a beam different from the beam emitted from the first light source 11. The coupling lens 32 as a single unit is designed to have a wavefront approximately proportional to a field angle.

In the optical pickup device according to the present embodiment, each of the optical path separating units 21 and 22 uses the combination of the polarization hologram and the λ/4 plate, and, thereby, a separation of the returning beam from the beam emitted from each of the light sources can be performed at a high efficiency.

However, the separation of the returning beam can be performed by an ordinary hologram. That is, for example, an ordinary hologram having no polarization characteristic can be used to form the hologram shown in FIG. 3. In such a construction, a zero-order beam transmitting the hologram receiving no influence of a holographic action projected onto the optical recording medium from among beams emitted from the light sources. The beam deflected by the hologram from among the returning beams is received by the first and second light receiving units. In this structure, the optical efficiency is slightly lower than that of a case in which a separation of the optical paths is performed by using the above-mentioned polarization hologram. However, even in such a case, a sufficient signal detection for a practical use can be performed, and a cost of the optical pickup device can be reduced since the λ/4 plate is not required.

It should be noted that the first and second optical path separating units 21 and 22 and the first and second light receiving units 91 and 92 together constitute a signal detecting unit.

Additionally, a magnification ratio of the optical system formed by the second coupling lens 32 for the CD-R and the objective lens 6 is set to more than 0.2.

It should be noted that, in the present embodiment, although the λ/4 plate is provided in each of the first and second optical path separating units 21 and 22, the λ/4 plate may be provided at a different position along the optical path between the polarization hologram and the optical recording medium 7 or 8. For example, the λ/4 plate may be positioned between the optical path between the beam splitter 4 and the objective lens 6 so that the λ/4 plate is commonly used for the laser beams emitted from the first and second light sources 11 and 12. Although the laser beam emitted from the light sources 11 and 12 have different wavelengths, a λ/4 plate commonly used for the wavelengths λ1 and λ2 can be constituted by forming a thin film by a double refraction material having different refractive indexes and adjusting a thickness of the thin film.

Additionally, as mentioned above, in the present embodiment, an ordinary hologram having no polarization characteristic may be used for the hologram shown in FIG. 3 in the first and second optical path separating units 21 and 22. Accordingly, the separation of the returning beam does not require the λ/4 plate since a state of polarization is not utilized for the separation.

Figure 5:
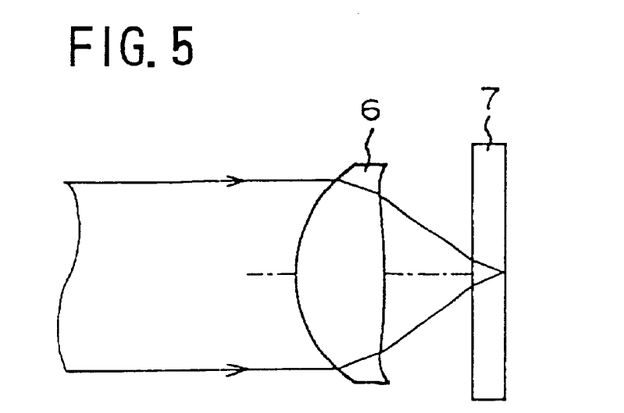
FIG. 5 is an illustration for explaining a state of formation of a beam spot with respect to an optical recording medium having a small thickness.

FIG. 5 is an illustration for explaining a state of formation of the beam spot with respect to the optical recording medium 7 having a smaller thickness. The laser beam emitted from the first light source 11 is changed into a parallel beam by the coupling lens 31 (not shown in FIG. 5) and is incident on the objective lens 6 so as to form a beam spot on the recording surface of the optical recording medium 7. As mentioned above, the objective lens 6 and the coupling lens 31 are designed so that an appropriate beam spot is formed.

Figure 6:
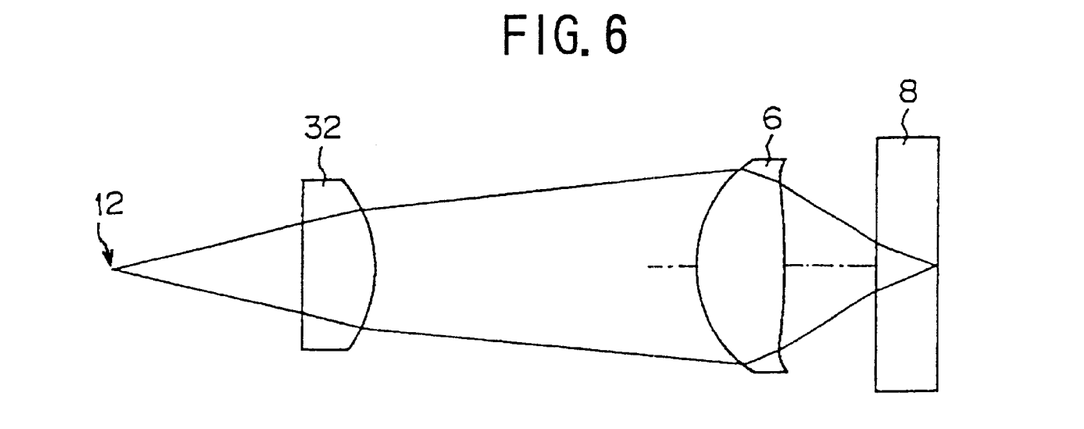
FIG. 6 is an illustration for explaining a state of formation of the beam spot with respect to an optical recording medium having a large thickness.

FIG. 6 is an illustration for explaining a state of formation of the beam spot with respect to the optical recording medium 8 having a larger thickness. In FIG. 6, the laser beam emitted from the second light source 12 is changed into a beam having a predetermined divergent beam by the coupling lens 32, and is incident on the objective lens 6 so as to form a beam spot on the recording surface of the optical recording medium 8.

A description will now be given of a result of experiments using the optical pickup device according to the above-mentioned embodiment.

In the experiments, a DVD having a base plate having a thickness of 0.6 mm was used as the optical recording medium 7 having a smaller thickness, and a CD-R having a base plate having a thickness of 1.2 mm was used as the optical recording medium 8 having a larger thickness. The base plates of each of the DVD and the CD-R had a refraction index $n_{650}=1.580$ with respect to the wavelength $\lambda 1=650$ nm and a refraction index $n_{785}=1.573$ with respect to the wavelength $\lambda 2=785$ nm.

A description will now be given of a configuration of the common objective lens 6 which was used in the experiments.

The common objective lens 6 was a single lens having an aspherical surface on opposite sides. The objective lens 6 was made of a material having a refraction index $n_{650}=1.586$ with respect to the wavelength $\lambda 1=650$ nm and a refraction index $n_{785}=1.582$ with respect to the wavelength $\lambda 2=785$ nm.

The above-mentioned aspherical surface was a curved surface formed by rotating a curvilinear shape about the X axis, the curvilinear shape being defined by the following equation (1) by giving R, K, A, B, C and D.

$$X=(Y^2/R)/[1+\sqrt{1-(1+K)(Y/R)^2}]+A\cdot Y^4+B\cdot Y^6+C\cdot Y^8+D\cdot Y^{10} \quad (1)$$

Configuration of the Objective Lens

| Surface Factor | First Surface | Second Surface |
|---|---|---|
| R | 2.11872 | −15.34382 |
| K | −0.518280 | 14.682633 |
| A | 0.262089E−3 | 0.803950E−2 |
| B | −0.115589E−3 | −0.219719E−2 |
| C | −0.228469E−4 | 0.362251E−3 |
| D | −0.947513E−5 | −0.257317E−4 |

In the above table, the first surface is a surface of the objective lens 6 on the side of the light source, and the second surface is a surface of the objective lens 6 on the side of the optical recording medium. A distance (a center thickness) between the first surface and the second surface measured along the optical axis was 1.795 mm. Hereinafter, this objective lens 6 is referred to as a reference objective lens. It should be noted that a suffix E-n (n=1, 2, 3, . . . ) represents "×10$^{-n}$" which is a multiplier with respect to the preceding number.

The above-mentioned reference objective lens had a focal length of 3.3 mm. The coupling lens 31 for the first light source 11 was optimized so that an extremely good beam spot was obtained when the laser beam coupled as a parallel beam having the wavelength of 650 nm was focused on the recording surface of the optical recording medium 7 (DVD) having a smaller thickness by the reference objective lens.

When the reference objective lens was used alone, a good beam spot was formed by the beam having the wavelength of 785 nm. That is, the beam having the wavelength of 785 nm was focused on the recording surface of the optical recording medium having the larger thickness by the reference objective lens alone with a numerical aperture NA=0.5 and an object distance of 65 mm. In this case, a wavefront aberration with respect to the optical axis was $0.02\lambda$ by using $\lambda$ as a unit, which wavefront aberration was sufficiently small for obtaining a beam spot within a diffraction limit.

However, in this case, the magnification was as low as 0.53. Thus, the optical efficiency for the beam emitted from the second light source was extremely low. Thereby, an extremely large power was required to record information on the CD-R. Thus, is not practical to use the reference objective lens without a coupling lens 32 with respect to the beam emitted from the second light source 12. An appropriate magnification was about 0.28 when recording and reproducing or recording, reproducing and erasing are performed on the CD-R.

Thus, the beam emitted from the second light source 12 was coupled by using a coupling lens 32 for the second light source 12 and the beam was focused on the recording surface of the optical recording medium 8 having a larger thickness by the reference objective lens. With respect to the beam emitted from the second light source 12, the reference objective lens having a numerical aperture NA=0.5 and a magnification of 0.28 was used.

First, as the coupling lens 32 for the second light source 12, a lens optimized to have almost no aberration alone was used. This coupling lens 32 is hereinafter referred to as a first comparison lens. The first comparison lens was designed to have a focal length of 11 mm and an object distance of 65 mm with respect to the reference objective lens. The object distance is for a virtual light source of a beam coupled by the coupling lens 32.

Each surface of the first comparison lens was an aspherical surface, and the shape of each surface was determined as follows.

Configuration of the First Comparison Lens

| Surface Factor | First Surface | Second Surface |
|---|---|---|
| R | 5.28659 | 24.9828 |
| K | 0.0 | 21.536618 |
| A | −0.317154E−4 | 0.411875E−3 |
| B | −0.244439E−5 | 0.291287E−4 |
| C | −0.394763E−4 | −0.259571E−3 |
| D | 0.183678E−4 | 0.171300E−3 |

The center thickness was 2.0 mm, and a refractive index of the material was n=1.582 with respect to the wavelength of 785 nm.

The wavefront aberration along the optical axis was as small as $0.01\lambda$ when the first comparison lens was used as a coupling lens 32 in combination with the reference objective lens with a numerical aperture NA=0.5 and a magnification of 0.28, and, thereby, a performance as a combined optical system was good. However, deterioration in the wavefront aberration is large when the optical axis of the reference objective lens was offset.

During a tracking operation for the CD-R, an offset of an objective lens 6 becomes as large as 0.4 mm. In the above-mentioned combined system of the reference objective lens and the first comparison lens, if the offset of the optical axis of the reference objective lens was 0.4 mm, the wavefront aberration (coma) was deteriorated up to $0.062\lambda$. The wavefront aberration of $0.062\lambda$ is below the Maréchal criterion of $0.07\lambda$. However, considering allowable tolerances of assembly, the wavefront may be further deteriorated, and may exceed the Maréchal criterion. Accordingly, there is a problem with using use the combination of the reference objective lens and the first comparison lens in practice.

That is, when the wavefront aberration is $0.07\lambda$, which is a Maréchal criterion, a peak value of an intensity distribution of the beam spot is reduced down to 80 percent of that when there is no aberration. If a wavefront aberration fluctuates in response to a tracking operation when recording information on the CD-R, a peak value of the optical intensity distribution of the beam spot fluctuates, and, thereby, there is a problem with a writing operation.

Accordingly, the following lens was prepared as a second comparison lens to be combined with the reference objective lens.

Each surface of the second comparison lens was an aspherical surface, and the shape of each surface was determined as follows.

Configuration of the Second Comparison Lens

| Surface Factor | First Surface | Second Surface |
|---|---|---|
| R | 8.30666 | −25.51944 |
| K | 0.0 | 0.0 |
| A | 0.243927E−3 | 0.694049E−3 |
| B | 0.107313E−3 | 0.144410E−3 |
| C | 0.149649E−4 | 0.109022E−4 |
| D | 0.142713E−4 | −0.181835E−4 |

The center thickness was 2.0 mm, and a refractive index of the material was n=1.582 with respect to the wavelength of 785 nm.

The wavefront aberration along the optical axis was as small as $0.014\lambda$ when the second comparison lens was used as a coupling lens 32 in combination with the reference objective lens with a numerical aperture NA=0.5 and a magnification of 0.28. However, when the optical axis of the reference objective lens was offset by 0.4 mm, the wavefront aberration was deteriorated up to $0.071\lambda$ which exceeds the Maréchal criterion, and, thus, there is a problem with practical use of the above combination.

The following are examples of combinations of the coupling lens 32 and the reference objective lens.

EXAMPLE 1

In the coupling lens 32 of the Example 1, the first surface was an aspherical surface and the second surface was a flat surface. The configuration of the coupling lens 32 of the Example 1 was determined as follows.

Configuration of the Coupling Lens 32 of the Example 1

| Surface Factor | First Surface | Second Surface |
|---|---|---|
| R | 8.30666 | −25.51944 |
| K | 0.0 | 0.0 |
| A | 0.243927E−3 | 0.694049E−3 |
| B | 0.107313E−3 | 0.144410E−3 |
| C | 0.149649E−4 | 0.109022E−4 |
| D | 0.142713E−4 | −0.181835E−4 |

The center thickness was 2.0 mm, and a refractive index of the material was n=1.582 with respect to the wavelength of 785 nm. A focal length was 11 mm. The object distance of the coupling lens 32 alone was 25 mm. A wavefront aberration (coma) was proportional to a field angle.

The wavefront aberration along the optical axis was as small as $0.008\lambda$ when the coupling lens of the Example 1 was used in combination with the reference objective lens with a numerical aperture NA=0.5 and a magnification of 0.28. Even when the optical axis of the reference objective lens was offset by 0.4 mm, the wavefront aberration was as sufficiently small as $0.014\lambda$.

The following is a comparison between the second comparison lens and the coupling lens 32 of the Example 1 with respect to a wavefront aberration (coma: unit $\lambda$) relative to a field angle.

| Field Angle (degrees) | Second Comparison Coupling Lens | Coupling Lens of Example 1 |
|---|---|---|
| 0.0 | 0.000 | 0.000 |
| 0.5 | 0.001 | 0.014 |
| 1.0 | 0.005 | 0.028 |
| 1.5 | 0.011 | 0.042 |

As can be appreciated from the above table, the wavefront aberration increases in approximately proportionally to the field angle in the coupling lens 32 of the Example 1, whereas the wavefront aberration associated with the field angle is small but sharply increases as the field angle increases in the second comparison lens.

EXAMPLE 2

In the coupling lens 32 of the Example 2, the first surface was an aspherical surface and the second surface was a spherical surface. The configuration of the coupling lens 32 of the Example 2 was determined as follows.

Configuration of the Coupling Lens 32 of the Example 2

| Surface Factor | First Surface | Second Surface |
|---|---|---|
| R | 6.79439 | −100.0 |
| K | 0.0 | 0.0 |
| A | −0.448639E−3 | 0.0 |
| B | −0.220084E−4 | 0.0 |
| C | 0.996038E−5 | 0.0 |
| D | −0.197779E−5 | −0.0 |

The center thickness was 2.0 mm, and a refractive index of the material was n=1.582 with respect to the wavelength of 785 nm. A focal length was 11 mm. The object distance of the coupling lens 32 alone was 25 mm. A wavefront aberration (coma) was proportional to a field angle.

The wavefront aberration along the optical axis was as small as $0.009\lambda$ when the coupling lens 32 of the Example 2 was used in combination with the reference objective lens with a numerical aperture NA=0.5 and a magnification of 0.28. Even when the optical axis of the reference objective lens was offset by 0.4 mm, the wavefront aberration was as sufficiently small as $0.027\lambda$.

The wavefront aberration with respect to the field angle of the coupling lens 32 of the Example 2 was as follows.

| Field Angle (degrees) | Coupling Lens of Example 2 |
|---|---|
| 0.0 | 0.000 |
| 0.5 | 0.012 |
| 1.0 | 0.024 |
| 1.5 | 0.037 |

As can be appreciated from the above table, the wavefront aberration increases approximately proportionally to the field angle in the coupling lens 32 of the Example 2.

EXAMPLE 3

In the coupling lens 32 of the Example 3, the first surface was an aspherical surface and the second surface was a spherical surface. The configuration of the coupling lens 32 of the Example 3 was determined as follows.

Configuration of the Coupling Lens 32 of the Example 3

| Surface Factor | First Surface | Second Surface |
|---|---|---|
| R | 6.06490 | 100.0 |
| K | 0.0 | 0.0 |
| A | −0.549826E−3 | 0.0 |
| B | −0.363693E−4 | 0.0 |
| C | 0.170120E−4 | 0.0 |
| D | −0.358567E−5 | −0.0 |

The center thickness was 2.0 mm, and a refractive index of the material was n=1.582 with respect to the wavelength of 785 nm. A focal length was 11 mm. The object distance of the coupling lens 32 alone was 25 mm. A wavefront aberration (coma) was proportional to a field angle.

The wavefront aberration along the optical axis was as small as $0.008\lambda$ when the coupling lens 32 of the Example 3 was used in combination with the reference objective lens with a numerical aperture NA=0.5 and a magnification of 0.28. Even when the optical axis of the reference objective lens was offset by 0.4 mm, the wavefront aberration was as sufficiently small as $0.020\lambda$.

The wavefront aberration with respect to the field angle of the coupling lens 32 of the Example 3 was as follows.

| Field Angle (degrees) | Coupling Lens of Example 3 |
|---|---|
| 0.0 | 0.000 |
| 0.5 | 0.015 |
| 1.0 | 0.031 |
| 1.5 | 0.047 |

As can be appreciated from the above table, the wavefront aberration increases approximately proportionally to the field angle in the coupling lens 32 of the Example 3.

EXAMPLE 4

In the coupling lens of the Example 4, both the first surface and the second surface were aspherical surfaces. The configuration of the coupling lens of the Example 4 was determined as follows.

Configuration of the Coupling Lens of the Example 4

| Surface Factor | First Surface | Second Surface |
|---|---|---|
| R | 7.0 | −69.80093 |
| K | 0.0 | 0.0 |
| A | −0.356141E−3 | 0.931515E−4 |
| B | −0.312011E−5 | −0.621911E−6 |
| C | −0.625079E−7 | −0.161329E−7 |
| D | 0.279800E−8 | 0.589625E−8 |

The center thickness was 2.0 mm, and a refractive index of the material was n=1.582 with respect to the wavelength of 785 nm. A focal length was 11 mm. The object distance of the coupling lens 32 alone was 25 mm. A wavefront aberration (coma) was proportional to a field angle.

The wavefront aberration along the optical axis was as small as $0.009\lambda$ when the coupling lens 32 of the Example 4 was used in combination with the reference objective lens with a numerical aperture NA=0.5 and a magnification of 0.28. Even when the optical axis of the reference objective lens was offset by 0.4 mm, the wavefront aberration was as sufficiently small as $0.030\lambda$.

The wavefront aberration with respect to the field angle of the coupling lens 32 of the Example 4 was as follows.

| Field Angle (degrees) | Coupling Lens of Example 4 |
|---|---|
| 0.0 | 0.000 |
| 0.5 | 0.011 |
| 1.0 | 0.022 |
| 1.5 | 0.033 |

As can be appreciated from the above table, the wavefront aberration increases approximately proportionally to the field angle in the coupling lens 32 of the Example 4.

EXAMPLE 5

The coupling lens 32 of the Example 5 was a junction lens formed by coupling two spherical lenses. A radius R, a distance D between surfaces and a refraction index N with respect to a beam having the wavelength of 785 nm for the first surface (on the side of the light source), the second surface (junction surface) and the third surface (on the side of the optical recording medium) are given below.

| | R | D | N |
|---|---|---|---|
| First Surface | 6.38 | 1.5 | 1.582 |
| Second Surface | −4.39 | 1.0 | 1.785 |
| Third Surface | −16.63 | | |

A focal length was 11 mm. The object distance of the coupling lens 32 alone was 25 mm. A wavefront aberration (coma) was proportional to a field angle.

The wavefront aberration along the optical axis was as small as $0.012\lambda$ when the coupling lens of the Example 5 was used in combination with the reference objective lens with a numerical aperture NA=0.5 and a magnification of 0.28. Even when the optical axis of the reference objective lens was offset by 0.4 mm, the wavefront aberration was as sufficiently small as $0.025\lambda$.

The wavefront aberration with respect to the field angle of the coupling lens 32 of the Example 5 was as follows.

| Field Angle (degrees) | Coupling Lens of Example 5 |
|---|---|
| 0.0 | 0.000 |
| 0.5 | 0.016 |
| 1.0 | 0.033 |
| 1.5 | 0.050 |

As can be appreciated from the above table, the wavefront aberration increases in approximately proportionally to the field angle in the coupling lens 32 of the Example 5.

EXAMPLE 6

The coupling lens 32 of the Example 6 was a junction lens formed by coupling two spherical lenses. A radius R, a distance D between surfaces and a refraction index N with respect to a beam having the wavelength of 785 nm for the first surface (on the side of the light source), the second surface (junction surface) and the third surface (on the side of the optical recording medium) are given below.

|  | R | D | N |
|---|---|---|---|
| First Surface | 4.55 | 1.5 | 1.582 |
| Second Surface | −5.556 | 1.0 | 1.785 |
| Third Surface | 130.542 |  |  |

A focal length was 11 mm. The object distance of the coupling lens alone was infinitely distant. A wavefront aberration (coma) was proportional to a field angle.

The wavefront aberration along the optical axis was as small as 0.012λ when the coupling lens 32 of the Example 6 was used in combination with the reference objective lens with a numerical aperture NA=0.5 and a magnification of 0.28. Even when the optical axis of the reference objective lens was offset by 0.4 mm, the wavefront aberration was as sufficiently small as 0.025λ.

The wavefront aberration with respect to the field angle of the coupling lens 32 of the Example 6 was as follows.

| Field Angle (degrees) | Coupling Lens of Example 6 |
|---|---|
| 0.0 | 0.000 |
| 0.5 | 0.017 |
| 1.0 | 0.033 |
| 1.5 | 0.051 |

As can be appreciated from the above table, the wavefront aberration increases approximately proportionally to the field angle in the coupling lens 32 of the Example 6.

The coupling lenses 32 of the above-mentioned Examples 1 to 6 are effective not only for the reference objective lens but also for other objective lenses in combination.

Figure 7:
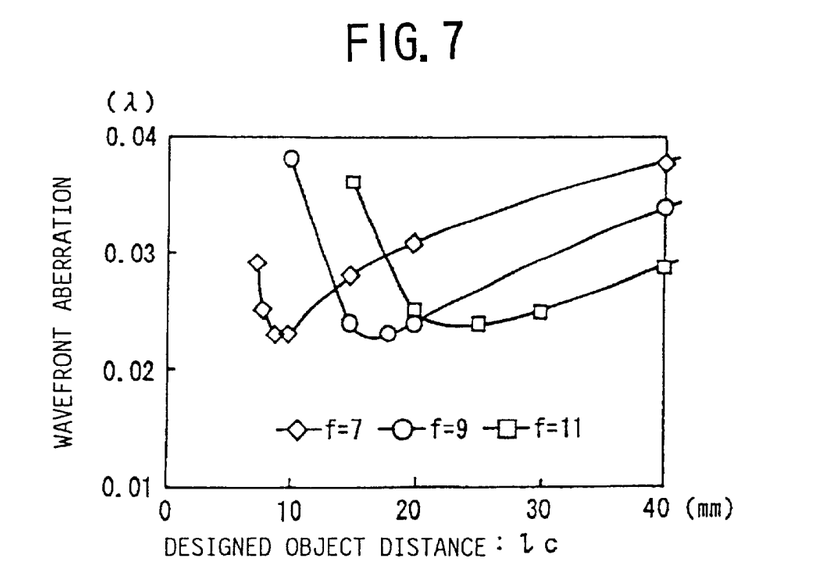
FIG. 7 is a graph showing a relationship between a wavefront aberration and an object distance.

FIG. 7 is a graph showing a relationship between a wavefront aberration and an object distance lc when the optical axis of the reference objective lens is offset by 0.4 mm in a case in which the object distance lc of the coupling lens of the Example 1 is varied and combined with the reference objective lens with a magnification of 0.28. In the graph, three curves are shown each of which is characterized by a different focal length f(mm) of the coupling lens 32, that is, f=7, f=9 and f=11.

Figure 8:
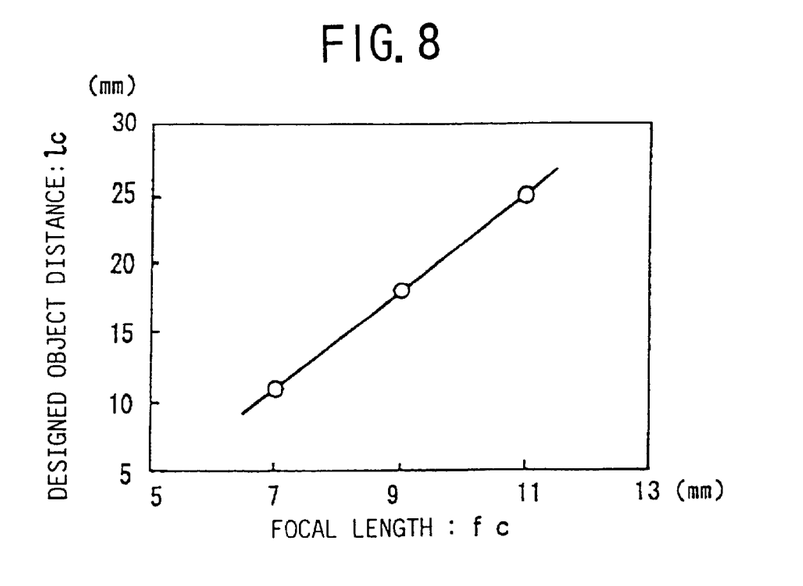
FIG. 8 is a graph showing a relationship between a focal length and a designed object distance when a wavefront aberration is minimum.

A minimum point of each of the curves in the graph of FIG. 7 corresponds to the minimum value of the wavefront aberration (coma) of the beam spot when the offset of the reference objective lens is 0.4 mm. FIG. 8 is a graph showing a relationship between the focal length fc and the designed object distance lc when the wavefront aberration is minimum. As shown in FIG. 8, a proportional relation is established between the focal length fc and the designed object distance lc. That is, when the coupling lens for the second light source is designed as a single lens having a flat surface on one side and an aspherical surface on the opposite side and if the focal length fc and the designed object distance lc of the coupling lens satisfy a relationship lc=α·fc (α is defined as an inclination of a line shown in FIG. 8), the wavefront aberration associated with the above-mentioned offset in the optical axis is minimized. Accordingly, once the relationship lc=α·fc is determined if one of the object distance and the focal length is determined, the other of the object distance and the focal length can be easily determined by the relationship. Thus, a design of the coupling lens can be very easy.

A description will now be given of a second embodiment of the present invention.

Figure 9:
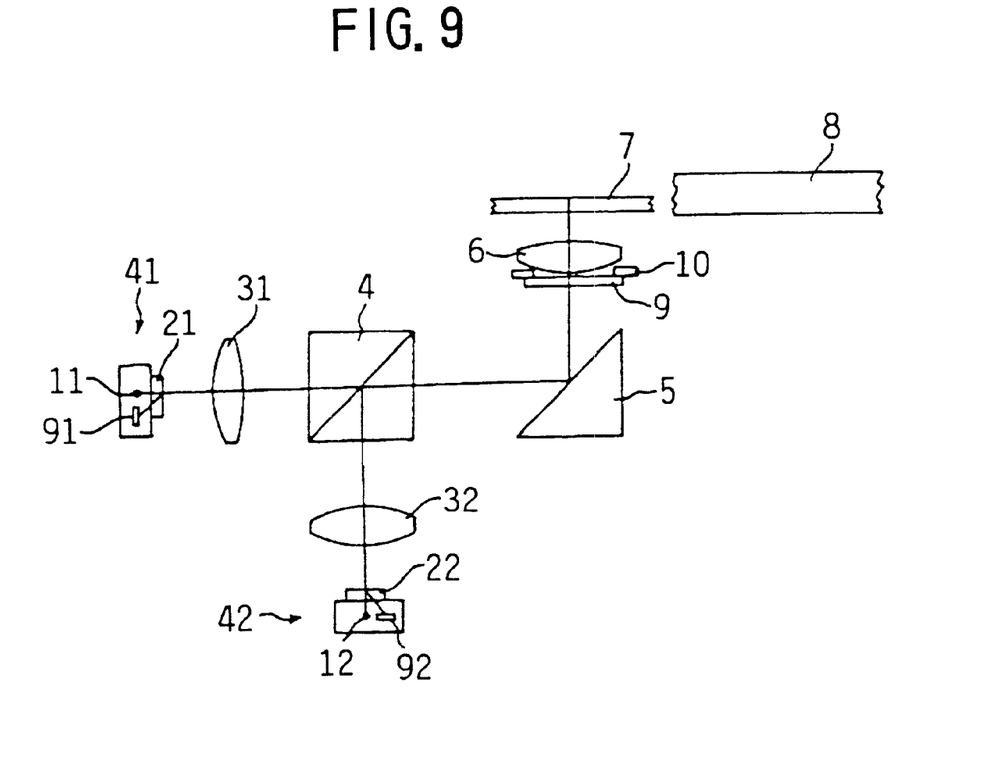
FIG. 9 is an illustration of an optical system of an optical pickup device according to a second embodiment of the present invention.

FIG. 9 is an illustration of an optical pickup device according to the second embodiment of the present invention. The optical pickup device according to the second embodiment of the present invention has the same structure as the above-mentioned optical pickup device according to the first embodiment of the present invention except for a first aperture limiting member 10 and a second aperture limiting member 9 being provided adjacent to an objective lens, and a prism being provided instead of the beam splitter 4. Accordingly, in FIG. 9, parts that are the same as the parts shown in FIG. 1 are given the same reference numerals, and descriptions thereof will be omitted.

As shown in FIG. 9, when the optical recording medium 7 having a smaller thickness is set, the first light source 11 is turned on and the second light source 12 is turned off. The beam emitted by the first light source 11 is incident on the first optical path separating unit 21. As mentioned above, three holograms A, B and C are formed in the first optical path separating unit 21. Each of the holograms A, B and C deflects a part of the incident beam, but a part of the incident beam transmits through the first optical path separating unit 21 as a zero order beam without being influenced by the holograms. In the present embodiment, the zero order beam of the beam emitted by the first light source 11 passing straight through the first optical path separating unit 21 is projected onto the optical recording medium 7.

The zero order beam passing straight through the first optical path separating unit 21 is coupled by the coupling lens 31, is changed into a parallel beam and enters a prism 4 serving as an optical path guiding unit. The prism 4 includes a dichroic filter having a spectral characteristic as shown in a graph of FIG. 10. Since the wavelength of the beam emitted by the first light source 11 is 650 nm, 100 percent of the beam incident on the prism 4 from a direction of the first light source 11 transmits through the prism 4. The beam exiting the prism 4 is deflected by the deflection prism 5 by 90 degrees, and enters the objective lens 6 via the second and first aperture limiting members 9 and 10. The laser beam incident on the objective lens 6 is projected onto the optical recording medium 7 having a smaller thickness so that the laser beam transmits through a base plate having a thickness of 0.6 mm and is focused on a recording surface so as to form a beam spot on the recording surface.

The laser beam projected onto the optical recording medium 7 is reflected by the recording surface, and returns toward the objective lens 6. The reflected laser beam may be referred to as a returning beam. The returning beam returns to the coupling lens 31 by being deflected by the deflection prism 5 and transmitted through the prism 4. The returning beam is condensed by the coupling lens 31, and enters the first optical path separating unit 21. Parts of the returning beam incident on the three holograms A, B and C of the first optical path separating unit 21 are deflected in different directions, and, thus, an optical path of the returning beam is separated from the optical path of the beam emitted by the first light source 11 toward the first optical path separating unit 21.

In the first beam-receiving unit 91, light receiving areas E, F, G and H are formed as shown in FIG. 4. A part of the returning beam incident on the hologram A of the polarization hologram 212 is deflected and is focused on a boundary between the light receiving areas E and F so that a focus error signal (corresponding to a difference (e−f) of outputs e and f of the light receiving areas E and F) is generated by a knife-edge method by using a boundary between the hologram A and each of the holograms B and C as a knife-edge. The returning beam incident on the holograms B and C is focused on the light receiving areas G and H respectively. A difference (g–h) between outputs g and h corresponding to the light receiving areas G and H is rendered to be a tracking error signal according to a push-pull method. Additionally, as a reproducing signal for reproducing information recorded on the recording surface, a signal (e+f+g+h) or a part of the signal (e+f+g+h) can be used.

In FIG. 9, when the optical recording medium 8 having a larger thickness is used instead of the recording medium 7 having a smaller thickness, the second light source 12 is used.

Figure 10:
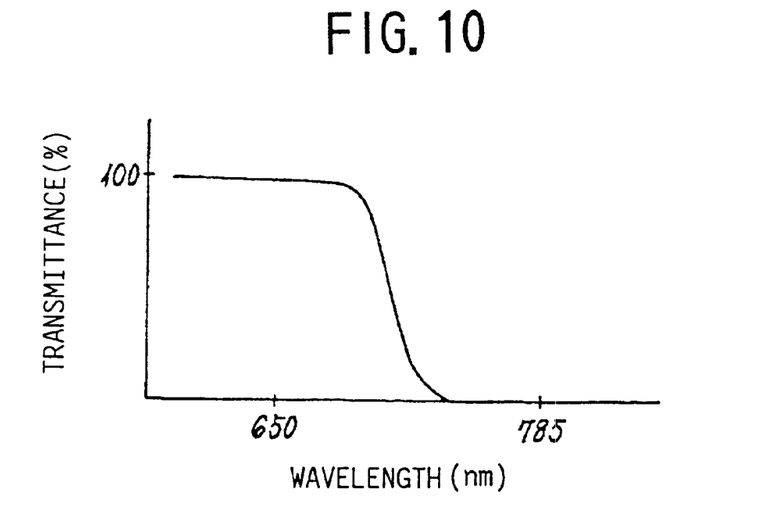
FIG. 10 is a graph showing a spectral characteristic of a wavelength selective filter.

The second optical path separating unit 22 comprises holograms the same as that of the first optical path separating unit 21. The zero order beam of the laser beam emitted by the second light source 12 passes straight the second optical path separating unit 22 is incident on the second coupling lens 32, and is changed into a beam having a predetermined divergence. Then, the divergent beam is incident on the prism 4. Since the dichroic filter formed in the prism 4 has the spectral characteristic as shown in the graph of FIG. 10, the beam emitted by the second light source 12 which has the wavelength of 785 nm is reflected by the dichroic filter toward the deflection prism 5. Accordingly, the beam is deflected by the deflection prism 5 and enters the objective lens 6 via the second and first aperture limiting members 9 and 10. The beam entering the objective lens 6 is projected onto the optical recording medium 8 having a larger thickness so that the laser beam transmits through a base plate having a thickness of 1.2 mm and is focused on a recording surface so as to form a beam spot on the recording surface.

The laser beam projected onto the optical recording medium 8 is reflected by the recording surface, and returns toward the objective lens 6. The reflected laser beam may be referred to as a returning beam. The returning beam returns to the coupling lens 32 by being deflected by the deflection prism 5 and reflected by the prism 4. The returning beam is converged by the coupling lens 32, and enters the second optical path separating unit 22. The returning beam incident on the second optical path separating unit is deflected in the similar manner as that of the first optical path separating unit 21, and, thus, the optical path of the returning beam is separated from the optical path of the laser beam emitted by the second light source 12 toward the second optical path separating unit 22.

In the present embodiment, normal holograms are used as the first and second optical path separating units 21 and 22, and the zero order beam passing through the holograms is projected onto the optical recording medium. However, a combination of polarization holograms and a ¼-wavelength plate may be used as the first and second optical path separating units 21 and 22 as in the above-mentioned first embodiment of the present invention.

The objective lens 6 is designed to match the beam emitted by the first light source 11. Additionally, the coupling lens 31 is designed for forming a good beam spot on the optical recording medium 7 having a smaller thickness in cooperation with the objective lens 6.

On the other hand, the second coupling lens 32 changes the beam emitted by the second light source to a divergent beam.

A description will now be given, with reference to FIG. 11, of the first and second aperture limiting members 10 and 9.

A diameter of an opening of the first aperture limiting member 10 is determined so that a numerical aperture of the objective lens 6 with respect to the beam emitted by the first light source 11 is equal to 0.6. A diameter of an opening of the second aperture limiting member 9 is determined so that a numerical aperture of the objective lens 6 with respect to the beam emitted by the second light source 12 is equal to 0.5.

Figure 11:
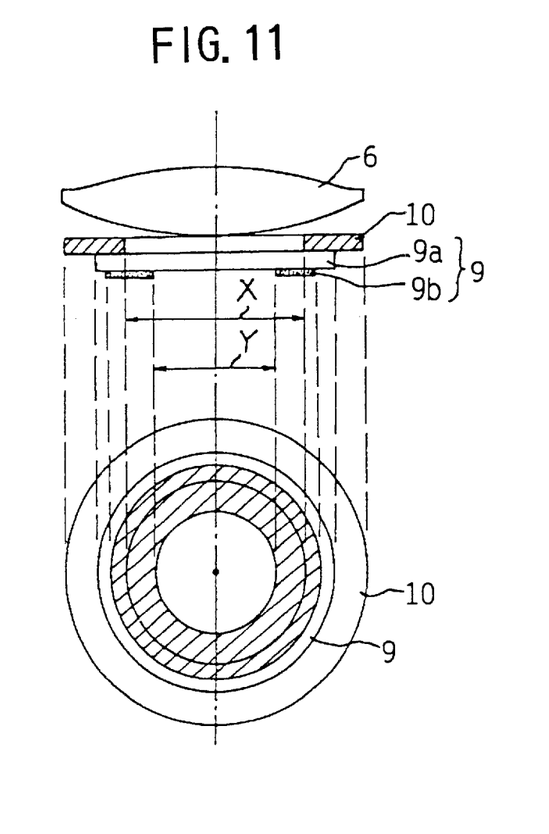
FIG. 11 is an illustration of first and second aperture limiting members shown in FIG. 9.

As shown in FIG. 11, the first aperture limiting member 10 is a ring-shaped light blocking member having an opening of which a diameter X is determined so that a numerical aperture of the objective lens 6 with respect to the beam emitted by the first light source 11 is equal to 0.6. On the other hand, the second aperture limiting member 9 comprises a transparent flat plate 9a and a wavelength selective filter 9b formed on the transparent flat plate 9a. The wavelength selective filter has an annular shape having an inner diameter Y which is smaller than the diameter X of the opening of the first aperture limiting member 10 (Y<X). An outer diameter of the wavelength selective filter 9b is greater than the diameter X of the opening of the first aperture limiting member 10.

The wavelength selective filter 9b has a spectral characteristic to transmit a beam having a wavelength $\lambda 1$=650 nm and reflect a beam having a wavelength $\lambda 2$=785 nm. The wavelength selective filter 9b can be formed as a dichroic filter having the spectral characteristic shown in FIG. 10.

Figure 12A:
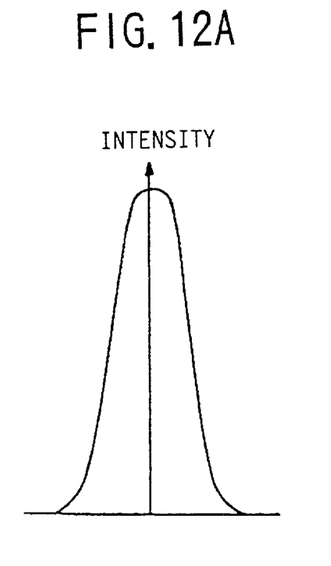
FIG. 12A is a graph showing an intensity distribution of a beam spot formed on an optical recording medium having a smaller thickness.

Accordingly, when the optical recording medium 7 having a smaller thickness is set, the beam emitted by the first light source 11 passes through the second aperture limiting member 9, that is, the beam emitted by the first light source 11 is transmitted the wavelength selective filter 9b. A diameter of the beam passing through the second aperture limiting member 9 is then limited by the opening of the first aperture limiting apparatus 10 having the diameter $\lambda$ so that the numerical aperture of the beam with respect to the objective lens 6 is set to 0.6. The thus-formed beam enters the objective lens 6, and is focused on the recording surface of the optical recording medium 7. Since the objective lens is designed to provide an optimum performance by considering the thickness of the optical recording medium 7, a good beam spot is formed on the recording surface. In this case, an optical intensity distribution of the beam spot indicates a typical Gaussian distribution as shown in FIG. 12A.

Figure 12B:
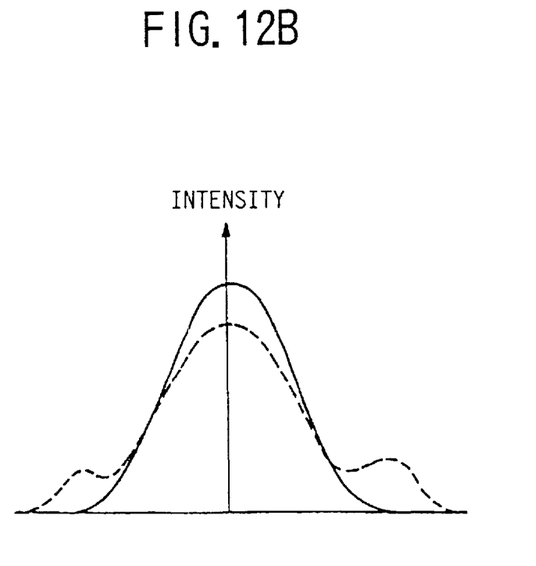
FIG. 12B is a graph showing an intensity distribution of a beam spot formed on an optical recording medium having a larger thickness.

On the other hand, when the optical recording medium 8 having a larger thickness is set, a diameter of the beam emitted by the second light source 12 is limited by the inner diameter Y of the second aperture limiting member 9. Accordingly, the numerical aperture of the beam with respect to the objective lens 6 is set to 0.5. The thus-formed beam enters the objective lens 6, and is focused on the recording surface of the optical recording medium 8 having a larger thickness. Generally, an aspherical aberration (wavefront aberration) of an objective lens is generated in an area remote from the optical axis of the objective lens. Thus, if the second aperture limiting member 9 is not provided, an optical intensity distribution of a beam spot formed on the recording surface becomes that shown in FIG. 12B due to the above-mentioned wavefront aberration. Accordingly, the wavefront aberration is deteriorated and side lobes are generated as indicated by a dashed line in FIG. 12B. This results in a decrease in a peak intensity and an increase in the diameter of the beam spot. Thus, when the second aperture limiting member 9 is not provided, it is difficult to perform a high-quality recording and reproducing operation.

However, in the present embodiment, a part of the beam incident on a periphery of the objective lens 6, which is a cause of the deterioration of the wavefront aberration, is eliminated by the second aperture limiting member 9, and, thereby, the deterioration of the wavefront aberration can be effectively prevented. As a result, according to the present embodiment, a beam spot having an intensity of a typical Gaussian distribution can also be achieved for the beam emitted by the second light source 12 as indicated by a solid line in FIG. 12B.

In the present embodiment as shown in FIG. 9, the wavelength selective filter 9b in the second aperture limiting member 9 is formed on a side of the transparent flat plate 9a facing the light source. Thus-formed wavelength selective filter 9b has the following technical advantage.

Figure 13:
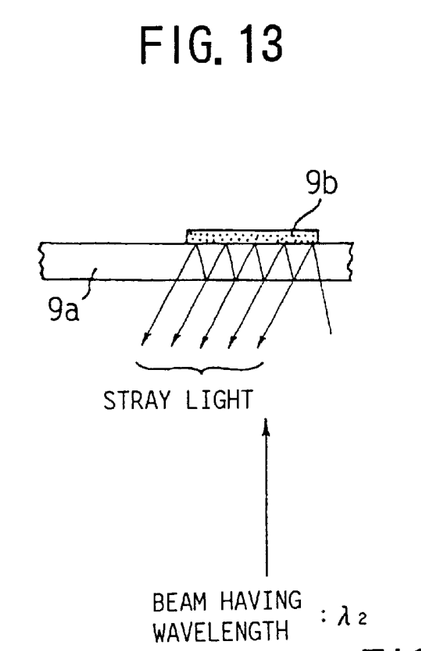
FIG. 13 is an illustration for explaining a stray light.

The wavelength selective filter 9b is a reflection film having a 100-percent reflectivity with respect to a beam having a wavelength $\lambda 2$. Thus, if the wavelength selective filter 9b is formed on a side opposite to the side facing the light source, that is, on a side facing the objective lens 6, a stray light may be generated due to reflection at the wavelength selective filter 9b as indicated in FIG. 13. The stray light is generated by the beam repeatedly being reflected between the surface on which the wavelength selective filter is formed and the opposite surface of the transparent flat plate 9a. If the thus-generated stray light returns to the returning beam receiving unit, a noise may be generated in the control signal or the information signal extracted from the returning beam. However, when the wavelength selective filter 9b is formed on the side facing the light source as in the present embodiment, such influence of the stray light can be effectively reduced.

Figure 14:
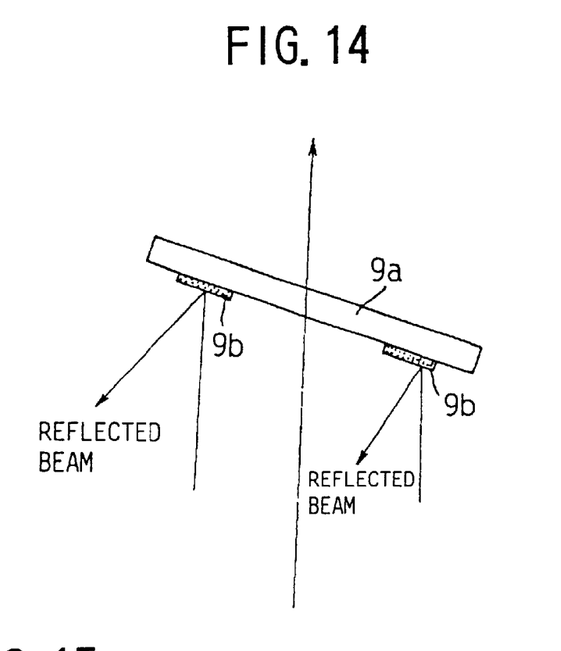
FIG. 14 is an illustration for explaining an advantage of the second aperture limiting member being slanted with respect to an optical axis of an incident beam.

In order to eliminate the influence of the stray light due to a reflection at the wavelength selective filter 9b, the transparent flat plate may be slanted with respect to the optical axis of the objective lens 6 as shown in FIG. 14. By slanting the transparent flat plate 9a, the stray light is directed in directions other than the direction toward the returning beam receiving unit, and, thereby, a reflected light is prevented from acting as the stray light influencing the signals.

When the second aperture limiting member 9 is slanted with the optical axis of the incident beam and if the shape of the inner opening of the wavelength selective filter is a circle, a shape of the opening viewed in the direction along the optical axis of the incident beam becomes an oval shape.

Figure 15:
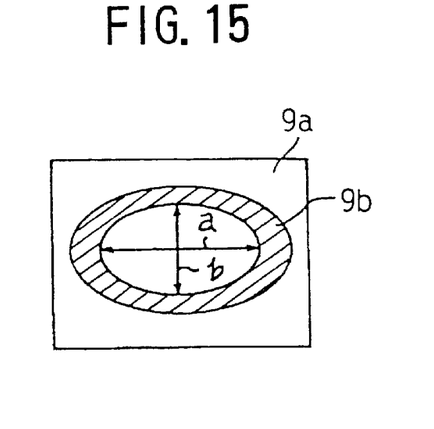
FIG. 15 is an illustration of the second aperture limiting member including a wavelength selective filter having an oval shape.

However, a shape of the beam spot formed on the recording surface preferably is as close as possible to a complete circle. If the second aperture limiting member 9 is slanted as mentioned above, the shape of the beam spot also becomes an oval shape. In order to prevent such a change in the shape of the beam spot, the wavelength selective filter 9b may be formed in an oval shape as shown in FIG. 15. In this case, the transparent flat plate 9a is slanted so that the major axis of the oval shape is slanted with respect to a plane perpendicular to the optical axis of the incident beam. A slanting angle of the transparent flat plate 9a is determined so that the shape of the inner opening of the wavelength selective filter 9b viewed in the direction along the optical axis of the incident beam becomes a circle. Specifically, if the inner opening of the wavelength selective filter 9b has a major axis a and a minor axis b as shown in FIG. 15, the slanting angle θ can be determined so that a relationship b=a·cos θ is satisfied.

Additionally, in the present embodiment, the second aperture limiting member 9 limits the opening by the wavelength selective filter 9b which transmits the beam having the wavelength $\lambda 1=650$ nm and reflects the beam having the wavelength $\lambda 2=785$ nm. This provides the following technical advantage.

A diameter of a beam spot formed by the beam having the wavelength $\lambda 1=650$ nm is smaller than that of the beam having the wavelength $\lambda 2=785$ nm. Thus, an allowable tolerance of the wavefront aberration with respect to the beam having the wavelength $\lambda 1=650$ nm is smaller than that of the beam having the wavelength of $\lambda 2=785$ nm. Accordingly, deterioration in the wavefront aberration with respect to the beam having the wavelength $\lambda 1=650$ nm must be minimized. ON the other hand, contrary to the above-mentioned embodiment, if the beam having the wavelength $\lambda 1=650$ nm is reflected by the second aperture limiting member 9, an extremely accurate surface roughness is required for surfaces of the transparent flat plate 9a.

Figure 16:
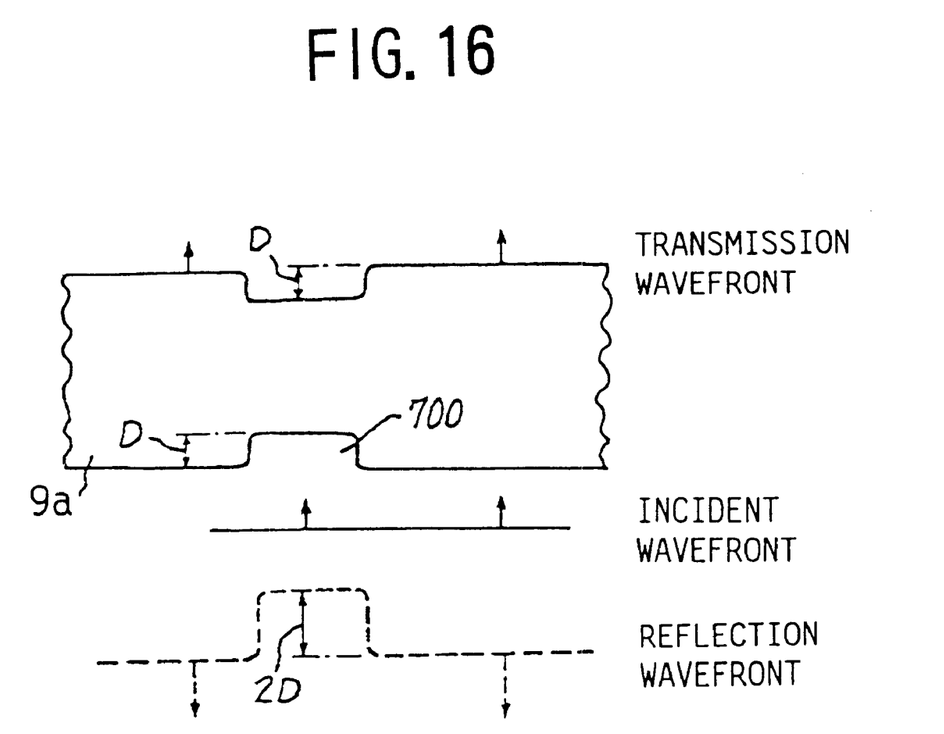
FIG. 16 is an illustration of a wavefront of a beam transmitting through a transparent flat plate having a fine depression.

It is supposed that the transparent flat plate 9a has a fine depression 700 having a depth D as shown in FIG. 16. When a beam having a flat wavefront is incident on the transparent flat plate 9a, a difference between a length of an optical path of the beam passing through the depression 700 and a length of an optical path of the beam passing through another part of the transparent flat plate 9a is equal to the depth D of the depression. On the other hand, considering the reflected beam, a difference in the optical paths is twice the depth D (2D). Thus, an influence of the depression 700 with respect to the reflected beam is increased twice, whereas the influence of the depression 700 with respect to the transmitted beam is not increased. Accordingly, in the present embodiment, the beam having the wavelength $\lambda 1=650$ nm is selected as the beam to be transmitted through the wavelength selective filter 9b.

As mentioned above, comparing a reflected beam and a transmitted beam, deterioration of a wavefront of the reflected beam is larger than that of the transmitted beam. In the present embodiment, the prism 4 serves as an optical path guiding unit which merges the optical path of the beam emitted by the second light source 12 with the optical path of the beam emitted by the first light source 11, using a transmission and a reflection of the dichroic filter film. Accordingly, if there is a fine roughness on an order of a wavelength on a surface of the prism 4 on which the dichroic filter is formed, a deterioration is generated in a wavefront due to a transmission and a reflection of the dichroic filter film. Thus, in the present embodiment, the beam having the wavelength $\lambda 1=650$ nm which beam is severely affected by a deterioration of a wavefront is selected as the beam to be transmitted through the prism 4, and the beam having the wavelength $\lambda 2=785$ nm which beam has a relatively large allowable tolerance for a deterioration of a wavefront is selected as the beam to be reflected by the prism 4. Thereby, a deterioration of the wavefront of the beam having the wavelength $\lambda 1=650$ is smaller than that of the beam having the wavelength $\lambda 1=785$ nm.

It should be noted that although the first aperture limiting member 10 and the second aperture limiting member 9 are formed as separate members in the present embodiment, these members may be integrally formed as a single member. In such a case, the light interrupting film of the first aperture limiting member and the wavelength selective filter 9b are formed on the same transparent plate.

The present invention is not limited to the specifically disclosed embodiments, and variations and modifications may be made without departing from the scope of the present invention.

The present application is based on Japanese priority applications No. 9-298425 filed on Oct. 30, 1997 and No. 9-327819 filed on Nov. 28, 1997, the entire contents of which are hereby incorporated by reference.

What is claimed is:

1. An optical pickup device applicable to both a first optical recording medium and a second optical recording medium, the second optical recording medium having a thickness larger than a thickness of the first optical recording medium, the optical pickup device comprising:

a first light source used for said first optical recording medium, said first light source emitting a fist beam having a first wavelength;

a second light source used for said second optical recording medium, said second light source emitting a second beam having a second wavelength;

an objective lens converging said first beam and projecting the converged first beam onto said first optical recording medium, said objective lens also converging said second beam and projecting the converged second beam onto said second optical recording medium, an optical path guiding unit guiding said first beam and said second beam to the same optical path directed to said objective lens;

a signal extracting unit for extracting signals from said first and second beams reflected by a selected one of said first optical recording medium and said second optical recording medium;

a first coupling lens coupling said first beam emitted from said first light source; and a second coupling lens coupling said second beam emitted from said second light source, said second coupling lens alone having a wavefront aberration substantially proportional to a field angle thereof so that said second beam after passing through said second coupling lens has a wavefront different from a wavefront of said first beam.

2. The optical pickup device as claimed in claim 1, wherein said objective lens has a performance optimum for at least one of a recording operation, a reproducing operation and an erasing operation performed on said first optical recording medium.

3. The optical pickup device as claimed in claim 1, wherein said second coupling: lens provides a predetermined divergence to said second beam.

4. The optical pickup device as claimed in claim 1, wherein said first coupling lens changes said first beam into a parallel beam.

5. The optical pickup device as claimed in claim 1, wherein said second coupling lens is a single lens, and one of opposite surfaces of said second coupling lens is an aspherical surface and the other is one of a spherical surface and a flat surface.

6. The optical pickup device as claimed in claim 1, wherein said second coupling lens includes two single lenses coupled to each other, each of opposite surfaces, of said second coupling lens is an aspherical source and a coupling surface between the opposite surfaces of said second coupling lens is also an aspherical surface.

7. The optical pickup device as claimed in claim 1, wherein said second coupling lens is a single lens having opposite surfaces of which one is a flat surface and the other is an aspherical surface; and said second coupling lens is designed to provide an optimum performance to a divergent beam having an object distance which satisfies a relationship $lc = \alpha * fc$, where $lc$ is a designed object distance, $fc$ is a focal length and $\alpha$ is a constant.

8. The optical pickup device as claimed in claim 1, further comprising:

a first returning beam receiving unit receiving a first returning beam reflected by said first optical recording medium and returning toward said first light source;

a first optical path separating unit separating an optical path of said first returning beam from an optical path of said first beam emitted by said first light source;

a second returning beam receiving unit receiving a second returning beam reflected by said second optical recording medium and returning toward said second light source; and a second optical path separating unit separating an optical path of said second returning beam from an optical path of said second beam emitted by said second light source, wherein said first light source, said first returning beam receiving unit and said first optical path separating unit together are integrated as a first light source/light receiving unit, and said second light source, said second returning beam receiving unit and said second optical path separating unit together are integrated as a second light source/light receiving unit.

9. The optical pickup device as claimed in claim 8, wherein said first optical path separating unit utilizes a state of polarization of said first beam so as to separate the optical path, and said second optical path separating unit utilizes a state of polarization of said second beam so as to separate the optical path.

10. The optical pickup device as claimed in claim 1, wherein said first optical recording medium has a base plate having a thickness of 0.6 mm and said second optical recording medium has a base plate having a thickness of 1.2 mm, and a magnification of an optical system comprising said second coupling lens and said objective lens is more than 0.2.

* * * * *